(12) United States Patent
Sanderson et al.

(10) Patent No.: US 6,600,002 B2
(45) Date of Patent: Jul. 29, 2003

(54) CHAIN-EXTENDED POLY(BIS-AZIDOMETHYLOXETANE), AND COMBUSTIBLE CARTRIDGE CASES AND AMMUNITION COMPRISING THE SAME

(75) Inventors: Andrew J. Sanderson, North Ogden, UT (US); William W. Edwards, Tremonton, UT (US); Paul C. Braithwaite, Brigham City, UT (US); Jeffrey D. Akester, Salt Lake City, UT (US); Jeff F. Widener, Ogden, UT (US)

(73) Assignee: Alliant Techsystems, Inc., Edina, MN (US)

( * ) Notice: Subject to any disclaimer, the term of this patent is extended or adjusted under 35 U.S.C. 154(b) by 0 days.

(21) Appl. No.: 09/841,900

(22) Filed: Apr. 24, 2001

(65) Prior Publication Data

US 2001/0047072 A1 Nov. 29, 2001

Related U.S. Application Data (60) Provisional application No. 60/201,208, filed on May 2, 2000.

(51) Int. Cl.[7] ................................................ C08G 18/10
(52) U.S. Cl. ........................................ 528/78; 102/466
(58) Field of Search ............................. 102/466; 528/78

(56) References Cited

U.S. PATENT DOCUMENTS

| | | |
|---|---|---|
| 3,722,412 A | 3/1973 | Herter |
| 3,749,023 A | 7/1973 | Kawaguchi et al. |
| 3,987,731 A | 10/1976 | Brzuskiewicz |
| 4,365,558 A | 12/1982 | Lippler et al. |
| 4,405,762 A | 9/1983 | Earl et al. |
| 4,483,978 A | 11/1984 | Manser |
| 4,707,540 A | 11/1987 | Manser et al. |
| 4,806,613 A | 2/1989 | Wardle |
| 4,997,497 A | 3/1991 | Wilson et al. |
| 5,223,056 A | 6/1993 | Ahad |
| 5,237,927 A | 8/1993 | Gonzalez et al. |
| 5,516,854 A | 5/1996 | Wardle et al. |
| 5,549,048 A | 8/1996 | Godfrey-Phillips et al. |
| 5,663,289 A | 9/1997 | Archibald et al. |
| 5,717,158 A | 2/1998 | Capellos et al. |
| 5,741,998 A | 4/1998 | Hinshaw et al. |
| 5,759,458 A | 6/1998 | Haaland et al. |

FOREIGN PATENT DOCUMENTS

| | | | |
|---|---|---|---|
| CA | 2214729 | * | 1/1999 |
| WO | WO 34350 | | 6/2000 |
| WO | WO 34353 | | 6/2000 |
| WO | WO 34209 | | 11/2000 |

* cited by examiner

*Primary Examiner*—Rachel Gorr
(74) *Attorney, Agent, or Firm*—Sullivan Law Group; Parsons Behle & Latimer (57) ABSTRACT

A combustible cartridge case is provided that includes at least one energetic thermoplastic homopolymer or copolymer derived from, at least in part, poly(bis-azidomethyloxetane) prepolymer blocks terminated with isocyanate-reactive groups, such as hydroxyl groups. Chain linking of the prepolymer blocks is performed with diisocyanates for end-capping the prepolymer blocks, and a difunctional linking compound for linking the end-capped prepolymer blocks. The energetic thermoplastic is preferably capable of being pressed, extruded, rotational molded, injection loaded, or otherwise shaped into a desired configuration. Also provided is a chain-extended poly(bis-azidomethyloxetane) homopolymer derived from bis-azidomethyloxetane prepolymer blocks, which are terminated with isocyanate-reactive groups and chain extended with at least one diisocyanate end-capping compound and at least one difunctional linking compound.

30 Claims, 4 Drawing Sheets

CHAIN-EXTENDED POLY(BIS-AZIDOMETHYLOXETANE), AND COMBUSTIBLE CARTRIDGE CASES AND AMMUNITION COMPRISING THE SAME

CROSS-REFERENCE TO RELATED APPLICATION

The benefit of priority is claimed of U.S. Provisional Application No. 60/201,208 filed in the U.S. Patent & Trademark Office on May 2, 2000, the complete disclosure of which is incorporated herein by reference.

GOVERNMENT LICENSE CLAUSE

The U.S. Government has a paid-up license in this invention and the right in limited circumstances to require the patent owner to license others on reasonable terms as provided for by the terms of contract DAAE30-99-M-0531 with the Armament Research Development and Engineering Center—Tank-Automotive and Armaments Command (TACOM-ARDEC).

BACKGROUND OF THE INVENTION

1. Field of the Invention

This invention relates to chain-extended poly(bis-azidomethyloxetane) energetic thermoplastics. This invention also relates to combustible cartridge cases for high performance direct-fire and indirect-fire ammunition, such as artillery and mortar rounds, and in particular to combustible cartridge cases comprising the chain-extended poly (bis-azidomethyloxetane) energetic thermoplastics.

2. Background of the Invention

Traditionally, weaponry cartridge cases were made of metals such as brass and steel. The selection of metallic materials made the cases resistant to high pressures produced in the cartridge chamber during firing. However, as outlined in U.S. Pat. No. 3,749,023 to Kawaguchi et al., metallic cartridge cases possess several disadvantages. For example, metals are relatively expensive. Further, spent metallic cartridge cases are thermally conductive, and, hence, remain relatively hot subsequent to firing of the loaded ammunition. Thus, great care must be exercised in handling of emptied metallic cartridge cases. Furthermore, it has been reported that the firing of ammunition having metallic cartridge cases can produce toxic gases, thus endangering the marksman.

To address the problems associated with metallic cartridge cases, most current combustible cartridge cases are made from combustible thermosetting materials. For example, the use of nitrocellulose is disclosed in U.S. Pat. No. 3,987,731 to Brzuskiewicz. Advantageously, combustible elements decompose by burning when the ammunition is fired, thus providing additional energy to propel the ammunition and obviating the need to eject and handle hot emptied cartridge cases after firing. Also, nitrocellulose-base cartridge cases possess lower weight and are less expensive than metallic cartridge cases. Disadvantageously, however, the fabrication of nitrocellulose cartridge cases is complex. Further, cartridge cases not meeting specifications or otherwise designated for scrap cannot be recycled by heating, but must be disposed of, typically by burning.

Thus, it would be a significant improvement in the art to design an ammunition case that combusts without generating contaminated waste, and that can be recycled by a simple re-heating process so as to lessen scrap waste disposal.

SUMMARY OF THE INVENTION

It is, therefore, an object of this invention to provide an ammunition case that fulfills the above-mentioned improvement in the art.

In accordance with the principles of this invention, the above and other objects are attained by a combustible cartridge case comprising at least one energetic binder derived from, as an ingredient prior to chain extension, poly(bis-azidomethyloxetane) prepolymer blocks (also referred to herein as "poly(BAMO) blocks" or "polyBAMO pre-polymer blocks") terminated with isocyanate-reactive groups, such as hydroxyl groups. In one embodiment of the invention, a suitable linking system is used to link the poly(BAMO) blocks with each other for forming a chain-extended poly(BAMO) homopolymer. In another embodiment of the invention, using the linking system the poly (BAMO) blocks are linked to one or more prepolymer blocks, other than the BAMO prepolymer blocks, terminated with isocyanate reactive groups for forming a chain-extended poly(BAMO) copolymer or terpolymer. The linking system comprises diisocyanates for end-capping the prepolymer blocks, and a difunctional linking compound. The two functional groups of the difunctional linking compound are reactive with an isocyanate moiety of the diisocyanate for linking the end-capped prepolymer blocks and forming the chain-extended poly(BAMO).

Advantageously, the poly(BAMO) energetic thermoplastic of this invention can be pressed, extruded, rotational molded, injection loaded, or otherwise shaped into a desired configuration. The poly(BAMO) energetic thermoplastic also possesses mechanical, safety, and combustion characteristics that are highly compatible for use as a cartridge case. Another advantage of the novel poly(BAMO) energetic thermoplastic cartridge is its inherently safety. Although the energetic thermoplastic cartridge is highly energetic and burns rapidly at elevated pressures due to the presence of two azido moieties in each BAMO monomer unit, the energetic thermoplastic is sufficiently stable so that combustion is not sustained at room temperature or normal ambient pressures. Yet another advantage of the poly (BAMO) energetic thermoplastic cartridge case is that the thermoplastic can be recycled by melting, thus making the inventive cartridge case more efficient to recycle than conventional thermosets and eliminating scrap waste.

It is another object of this invention to provide an energetic thermoplastic material that is without a "soft" (non-crystalline) block so that the energetic thermoplastic material possesses high crystallinity and high density, yet has sufficient elasticity and strength to permit the material to be used as a combustible cartridge case, as well as for other propellant, explosive, and pyrotechnical applications. In accordance with this object, (bis-azidomethyloxetane) prepolymer blocks terminated with isocyanate-reactive groups are linked with a suitable linking system to form a chain-extended poly(BAMO) homopolymer. Chain-extended poly (BAMO) is extremely tough compared to other energetic thermoplastic elastomers, and has a high modulus and high stress at failure. Additionally, chain-extended poly(BAMO) behaves as a viscous liquid when heated above its melting point, thus offering attractive processing and disposal properties. As a consequence, chain-extended poly(BAMO) binder can be dissolved in appropriate solvents, and can be easily mixed with or separated from other energetic ingredients, such as oxidizers, plasticizers, and fuels.

Other objects, aspects, and advantages of this invention will become more apparent to those skilled in the art upon reading the specification and appended claims which, when taken in conjunction with the accompany drawings, explain the principles of this invention.

BRIEF DESCRIPTION OF THE DRAWINGS

The accompanying drawings serve to elucidate the principles of this invention. In such drawings.

DETAILED DESCRIPTION OF THE INVENTION

In accordance with a first preferred embodiment of this invention, a cartridge case comprises a chain-extended poly (BAMO) homopolymer derived from poly(BAMO) prepolymer blocks chain extended with an appropriate linking system.

The polyBAMO prepolymer blocks may be formed according to the cationic polymerization technique taught by Manser in U.S. Pat. No. 4,393,199, the complete disclosure of which is incorporated herein by reference. The technique employs an adduct of a substance such as a diol, e.g., 1,4-butane diol (BDO), and a catalyst for cationic polymerization, e.g., $BF_3$-etherate. This adduct forms with the BAMO monomer an initiating species which undergoes chain extension until n moles of monomer have been incorporated in the molecule, n being the ratio of monomers to adduct present. By adjusting the ratio of monomers to adduct present, the number average molecular weight of the prepolymer may be adjusted. Suitable number average molecular weights are from about 3000 to about 20,000, preferably about 7000.

Another suitable catalyst system includes co-catalytically effective quantities of one or more triethoxonium salts and one or more alcohols, as disclosed in allowed U.S. application Ser. No. 08/233,219, the complete disclosure of which is incorporated herein by reference. Examples of triethoxonium salts include triethoxonium hexafluorophosphate, triethoxonium hexafluoroantimonate, and triethoxonium tetrafluoroborate.

PolyBAMO prepolymer blocks normally have hydroxyl groups as their isocyanate-reactive functions, which are end-capped with the diisocyanates in accordance with the invention. Preferably, a first of the isocyanate moieties of the end-capping compound is substantially more reactive with the terminal-hydroxyl moieties of the polyBAMO prepolymer than the other (second) isocyanate moiety. The diisocyanate preferably is selected so that the first of the isocyanate moieties is capable of reacting with a hydroxyl-group of the polyBAMO prepolymer blocks while the second isocyanate moiety remains free and unreacted. Diisocyanates are preferably used because isocyanates of higher functionality would result in undesirable levels of cross-linking. The different reactivities of the isocyanate moieties is desirable to ensure that substantial chain extension through linking of like blocks does not occur. Thus, for purposes of this invention, one isocyanate moiety of the diisocyanate should preferably be approximately five times more reactive with terminal hydroxyl groups of polyBAMO prepolymer blocks than the other group. Preferably one isocyanate moiety is at least about ten times more reactive than the other.

One diisocyanate which is especially useful for purposes of the invention is 2,4-toluene diisocyanate (TDI) in which the isocyanate moiety in the 4-position is substantially more reactive with hindered terminal hydroxyl moieties than the isocyanate moiety in the 2-position. Isophorone diisocyanate (IPDI) is suitable for some applications, though less so than TDI. Examples of diisocyanates which have not worked as well include diphenylmethylene diisocyanate (MDI) and hexamethylene diisocyanate (HDI).

In the end-capping reaction, the diisocyanate is used at an approximately stoichiometric molar amount relative to terminal hydroxyl groups on the polyBAMO prepolymer. Thus, if the polyBAMO prepolymer chain has a pair of terminal hydroxyl groups, approximately two molar equivalents, e.g., 1.75–2.2 molar equivalents of diisocyanate are used. In the ideal reaction, all of the more reactive isocyanate moieties would react with terminal hydroxyl groups, leaving all of the less reactive isocyanate moieties free. Practically, not all of the diisocyanate reacts in this manner, and some chain extension does occur. Thus, the end-capping reaction may be maximized for particular polymer chains by some adjustment in the relative molar ratios of polyBAMO prepolymer block and diisocyanate.

The end-capping and linking reactions (discussed below) are carried out in a suitable solvent, preferably one which dissolves the polymer and does not react with the free isocyanate moieties. In a preferred embodiment, the solvent is non-halogenated. Although halogenated solvent may be present, the solution is preferably completely free of any halogenated solvent. The non-halogenated solvent should not react in the urethane reaction (i.e., does not interfere with the end capping catalyst, such as dibutyl tin dilaurate, or the linking catalyst) and forms an azeotrope with water. The solvent or solvents selected preferably are capable of dissolving more than 25% by weight of the blocks (based on total weight of the solvents and blocks) into solution, more preferably at least 35% by weight into solution, and still more preferably 50% by weight into solution. Representative solvents include cyclic ethers such as tetrahydrofuran (THF) and 1,4-dioxane; non-cyclic ethers such as ethylene glycol dimethyl ether; ketones such as methyl ethyl ketone (MEK); and esters such as ethyl acetate. Of these, THF is preferred because of its excellent solubility characteristics.

In a preferred embodiment, the solvent forms an azeotrope with water. In this preferred embodiment, after the blocks are dissolved in excess non-halogenated solvent, the solution may be dried by azeotropic distillation of the solvent, and optionally further concentrated, e.g., via distillation, in the solution to increase the volumetric loading and reaction rate. The blocks then can be end-capped and linked in the same or a different non-halogenated solvent. By distilling off excess solvent to remove water prior to end-capping, subsequent reaction with a diisocyanate can proceed without significant interference from competing reactions between the isocyanate moieties and water. Additionally, the solution remains homogeneous and further distillation serves to concentrate the polymer solution, producing higher reaction rates and requiring less reactor capacity. The reaction rates may be improved by conducting the end-capping reaction at elevated temperatures, such as 30° C. to 80° C., more preferably 40° C. to 60° C. The process may be conducted by a batch or continuous method. For example, the prepolymer and catalyst may be continuously fed through a mixer/extruder into which is injected a diisocyanate and a diol at appropriate feed rates so that urethane linking occurs within the extruder and energetic thermoplastic elastomer is continuously produced for processing.

Suitable catalysts for promoting the end-capping reaction include, as a preferred class, organic tin compounds with at least one and preferably two labile groups, such as chloride or acetate, bound directly to the tin. Suitable tin catalyst include diphenyl tin dichloride, dibutyl tin dichloride, dibutyl tin dilaurate, dibutyl tin diacetate. Tertiary amine catalysts may also be used.

The linking compound is one which has two functional groups which are sufficiently reactive and unhindered to react with the free isocyanate moieties on the end-capped polyBAMO prepolymer blocks so as to link the prepolymer blocks together in a urethane reaction. Preferred functional groups are hydroxyl groups, although amine, amide, and carboxyl groups, and mixtures thereof also react in a urethane reaction. Primary functional groups are preferred. The linking compound may be a short, straight carbon chain having terminal hydroxyl groups, e.g., 1,4-butanediol, 1,3-propanediol, ethylene glycol, and 1,6-hexanediol.

Alternatively, the linking compound may be an oligomer, especially a urethane oligomer, having two functional groups which are sufficiently unhindered to react with the free isocyanate moieties on the end-capped polyBAMO prepolymer blocks so as to link the end-capped prepolymer blocks in a urethane reaction. Preferred functional groups of the oligomer are hydroxyl groups, although amine, amide, and carboxyl groups, and mixtures thereof also react in a urethane reaction. Primary functional groups are preferred for the oligomers.

An oligomeric glycol containing urethane moieties is preferably used to react the free isocyanate moieties on the end-capped polyBAMO prepolymer blocks. The oligomeric glycol may be prepared by mixing one or more diisocyanates and an excess amount of one or more diols. The diisocyanate(s) and diol(s) selected and the molar ratio of these reagents may be varied to tailor the properties of the thermoplastic elastomer. The diol-to-diisocyanate ratio is preferably selected to be between 5:1 to 5:4, more preferably about 2:1, to maintain acceptable processing temperatures, obtain adequate linking of the isocyanate-capped polyBAMO prepolymers, and improve the thermomechanical properties of the final chain-extended thermoplastic elastomer. A suitable urethane reaction catalyst promotes the reaction between the diisocyanate(s) and diol(s) to form oligomers. The catalysts discussed above in connection with the linking of the prepolymer blocks are suitable for this purpose. Representative diols that may be selected for preparing the difunctional oligomer include, by way of example, unbranched aliphatic diols having 2 to 7 carbon atoms, such as ethylene glycol, propylene glycol, butylene glycol; and cycloaliphatic diols such as 1,4-cyclohexanedimethanol, and any combination thereof. Representative diisocyanates for preparing the difunctional oligomer include, by way of example, aliphatic diisocyanates such as hexane diisocyanate, and aryl diisocyanates such as methylene-bis(4-phenyl isocyanate), phenylene diisocyanate, toluene diisocyanate, and xylylene diisocyanate, and any combination thereof. Preferably, the difunctional oligomer has a number average molecular weight $M_n$ of from 350 to 900.

It is to be appreciated that a wide variety of difunctional compounds could be used for linking the end-capped blocks.

The linking compound is added in an amount such that the total number of linking-compound functional groups approximately equals the total number of free isocyanate groups of the end-capped polymer blocks. Thus, to provide an $(AB)_n$ polymer with multiple blocks in each chain, the linking compound to polymer block molar ratio is in the range of 0.9–1.1, e.g., 1.0. Accordingly, optimal molar ratios of blocks and linking chemicals may have to be empirically determined. The catalyst is thereby already present when the linking compound is added.

In accordance with a second preferred embodiment of the invention, the cartridge case comprises a chain-extended poly(BAMO) copolymer or terpolymer derived from poly(BAMO) blocks linked to additional prepolymer blocks derived from monomers other than BAMO. Representative co-polymerizable prepolymer blocks that can be linked with polyBAMO prepolymer blocks to form chain-extended poly(BAMO) copolymers and terpolymers include, by way of example, prepolymer blocks derived from other oxetane monomers and derivatives thereof, prepolymer blocks derived from oxirane monomers and derivatives thereof, prepolymer blocks derived from tetrahydrofuran and derivatives thereof, and combinations and copolymers of the same.

Oxetane monomer units that may be used in forming prepolymer blocks that are copolymerizable with the polyBAMO prepolymer blocks of the present invention have the general formula:

wherein the $R_1$ and $R_2$ groups are the same or different and are selected from moieties having the general formula: —$(CH_2)_n$X, where n is 0–10 and X is selected from the group consisting of —H, —$NO_2$, —CN, —Cl, —F, —O—alkyl, —OH, —I, —$ONO_2$, —N($NO_2$)-alkyl, —C≡CH, —Br, —CH═CH(H or alkyl), —$CO_2$—(H or alkyl), —N(H or alkyl)$_2$, —O—$(CH_2)_{1-5}$—O—$(CH_2)_{0-8}$—$CH_3$, and $N_3$.

Examples of oxetane derivatives that may be used in accordance with this invention are the following: generally symmetrically-substituted oxetanes including, but are not limited to, BEMO (3,3-(bis(ethoxymethyl)oxetane), BCMO (3,3-bis(chloromethyl)oxetane), BMMO (3,3-bis(methoxymethyl)oxetane), BFMO (3,3-bis(fluoromethyl)oxetane), BAOMO (3,3-bis(acetoxymethyl)oxetane), BHMO (3,3-bis(hydroxymethyl)oxetane), BMEMO (3,3-bis(methoxyethoxymethyl)oxetane), BIMO (3,3-bis(iodomethyl)oxetane), BNMO (3,3-bis(nitratomethyl)oxetane), and BMNAMO (3,3-bis(methylnitraminomethyl)oxetane); and non-symmetrically-substituted oxetanes including, but are not limited to, HMMO (3-hydroxymethyl-3-methyloxetane), OMMO (3-octoxymethyl-3-methyloxetane), CMMO (3-chloromethyl-3-methyloxetane), AMMO (3-azidomethyl-3-methyloxetane), IMMO (3-iodomethyl-3-methyloxetane), PMMO (3-propynomethylmethyloxetane), NMMO (3-nitratomethyl-3-methyloxetane), and MNAMMO (3-methylnitraminomethyl-3-methyloxetane).

Tetrahydrofuran monomer units that may be used in forming the prepolymer blocks for chain-extension with the BAMO prepolymer blocks of the present invention have the general formula:

wherein the $R_1$–$R_4$ groups are the same or different and are selected from moieties set forth above in connection with the description of suitable oxetane derivatives.

Oxirane monomer units suitable for use with the poly (BAMO) prepolymer of the present invention to form chain-extended copolymers and terpolymers have the general formula:

wherein $R_1$ and $R_3$ are independently selected from hydrogen and methyl, and $R_2$ and $R_4$ are independently selected from hydrogen, alkyl containing from 1 to 10 carbon atoms, chloroalkyl and bromoalkyl containing 1 to 2 carbon atoms, and nitratoalkyl, nitratoalkoxyalkyl, nitroalkyl, nitroalkoxyalkyl, azidoalkyl, azidoalkoxyalkyl, fluoronitroalkyl, and fluoronitroalkyoxyalkyl containing 1 to 5 carbon atoms provided that at least one of $R_1$ to $R_4$ is not hydrogen.

The oxirane homopolymer blocks may be formed according to the technique taught in U.S. Pat. No. 5,120,827. Examples of energetic oxiranes include, but are not limited to, glycidyl azide polymers ($C_3H_5N_3O$) (GAP), especially difunctional GAP, and poly(glycidyl nitrate) ($C_3H_5NO_4$) (PGN).

It is to be understood, however, that the presence of co-polymerizable prepolymer blocks should not negate the high modulus of elasticity and high energy imparted by the poly(BAMO) prepolymer. Preferably, the poly(BAMO) accounts for at least 50% by weight of the binder of the cartridge case. The modulus of elasticity is preferably maintained at 800 psi or greater.

Preparation of chain-extended poly(BAMO) copolymers and terpolymers is conducted in substantially the same manner as discussed above. As with the polyBAMO prepolymer blocks, the co-polymerizable prepolymer blocks also should have isocyanate-reactive functional groups, such as hydroxyl groups, amines, amides, and/or carboxyl groups.

In one modification to the second preferred embodiment, the polyBAMO prepolymer blocks are reacted separately with the diisocyanate from the co-polymerizable prepolymer blocks, so that the polyBAMO prepolymer blocks do not have to compete with the co-polymerizable prepolymer blocks for diisocyanate molecules. In this manner, the end-capping reactions may be carried out separately to substantial completion. The diisocyanate may react more rapidly with one block than the other, but this difference can be compensated for by a longer reaction time with the slower reacting block. The reactivity of the hydroxyl groups varies according to steric factors and also according to side-chain moieties. Once end-capped with diisocyanate, the reactivities of the polymers for linking purposes is essentially dependent only upon the reactivity of the free isocyanate, not on the chemical makeup of the polymer chain itself. It is to be understood, however, that it is within the scope of this invention to mix all of the prepolymer blocks together before end-capping, without prior separation of the blocks from their respective end-capping reaction mixtures.

In addition to the chain-extended poly(BAMO) homopolymer, copolymers, and terpolymers of this invention, the cartridge case energetic composition can comprise one or more additional binders to modify the mechanical properties of the composition. Representative polymers that can be included in the composition as an additional binder include polyethers, such as polyethylene glycol (PEG), polypropylene glycol (PPG), polybutylene oxide, polyoxetanes, polyoxiranes (e.g., polyglycidyl nitrate (PGN) and glycidyl azide polymer (GAP)) and random or block copolymers of the above. For example, POLY G® is a random copolymer of polyethylene glycol and polypropylene glycol, made by Olin Corporation. Other elastomeric binders that can be used include polyethylene, polypropylene, hydroxy-terminated polybutadiene, acrylic acid acrylonitrile polymer; butadiene terpolymer (PBAN). Although less preferred, thermosetting binders such as nitrocellulose and/or cellulose acetate butyrate (CAB), can be used with the chain-extended poly(BAMO). Criteria for selecting additional binders can be based on, for example, the need or desire to modify propellant mechanical properties (by tailoring binder functionality) and/or ballistic properties.

The total amount of binder present in the energetic composition is preferably in a range of from about 70% by weight to about 100% by weight. The amount of binder prepared from the polyBAMO prepolymers is preferably in a range of from about 50% by weight to about 100% by weight.

The energetic thermoplastic composition can include additives, as needed or desired, to modify mechanical or thermomechanical properties of the case. Solid additives which can be mixed with the chain-extended poly(BAMO) include, by way of example, energetic solids, oxidizers, ballistic modifiers, flame or flash suppressants, and combinations thereof. The total amount of solids (other than the binder), however, should not exceed about 30% by weight. More than about 30% by weight energetic composition can reduce the strength of the case below tolerable levels.

Representative energetic fillers that can be used in the energetic composition include, by way of example, NQ (nitroguanidine); nitramines, such as TEX (4,10-dinitro-2,6,8,12-tetraoxa-4,10-diazatetracyclo-[$5.5.0.0^{5,9}0^{3,11}$]-dodecane), RDX (1,3,5-trinitro-1,3,5-triaza-cyclohexane), HMX (1,3,5,7-tetranitro-1,3,5,7-tetraaza-cycloocatane), and HNIW or CL-20 (2,4,6,8,10,12-hexanitro-2,4,6,8,10,12-hexaazatetracyclo-[$5.5.0.0^{5,9}0^{3,11}$]-dodecane); NTO (3-nitro-1,2,4-triazol-5-one); TATB (1,3,5-triamino-2,4,6-trinitrobenzene); and TNAZ (1,3,3-trinitroazetidine); and nitrate esters, such as PETN (pentaerythritol tetranitrate); TNT (trinitrotoluene) and TNB (trinitrobenzene).

Representative oxidizers that can be used in the energetic thermoplastic composition include, by way of example, AP (ammonium perchlorate), AN (ammonium nitrate), HAN (hydroxylammonium nitrate), ADN (ammonium dinitramide), KN (potassium nitrate), KDN (potassium dinitramide), KP (potassium perchlorate), or combinations thereof.

Representative thermal stabilizers include, by way of example, N-methyl-p-nitroaniline (MNA), ethylcentralite (sym-diethyldiphenylurea), 2-nitrodiphenyl amine (2NDPA), N-ethyl-p-nitroaniline (NENA), and/or resorcinol. Representative ballistic modifiers include titanium dioxide, lead compounds (e.g., $Pb_3O_4$,), bismuth compounds, and salts of copper, tin, iron, and/or lead.

The energetic thermoplastic composition of this invention may be shaped into known case geometries by various techniques, including pressing, extrusion, or injection or rotational molding. Additionally, the case can be coated with a coating, such as a polyurethane coating, as is well known in the art.

Figure 1:
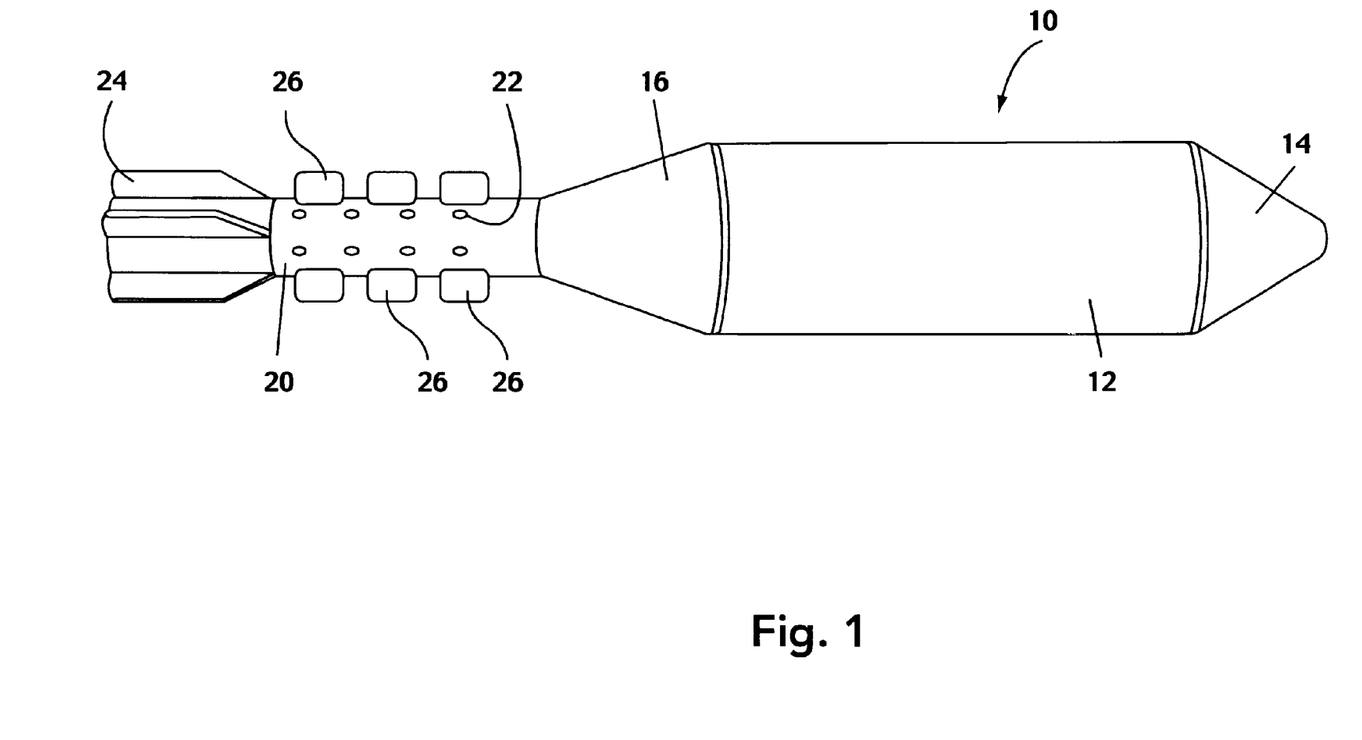
FIG. 1 is an elevational view of a mortar round loaded with three combustible cartridge cases prepared in accordance with an embodiment of this invention.

Referring now to FIG. 1, there is shown a mortar round 10 comprising a body 12 having an aerodynamic frustroconical forward portion 14 and a frustroconical aft portion 16. The body 12 usually includes an energetic composition, such as, for example, a high explosive, a flare charge, or decoy illuminant. An ignition system 20 extends from the aft frustroconical portion 16. The ignition system 20 comprises a cylindrical hollow shell having orifices 22, and an ignition charge (not shown) loaded within the cylindrical hollow shell. An representative ignition charge is black powder. A fin assembly 24 is disposed aft of the ignition system 20.

Figure 2A:
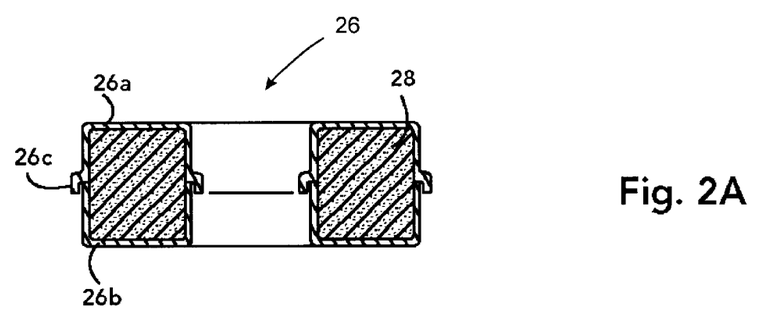
FIGS. 2A and 2B are side sectional and plan views, respectively, of one of the combustible cartridge cases loaded on the mortar round of FIG. 1.

Loaded about the cylindrical hollow shell of the ignition system 20 are three combustible cartridge cases 26. As shown also in FIG. 2A, each of the cartridge cases 26 is formed from upper and lower halves 26a and 26b, respectively. The upper half 26a has an overlapping trim portion 26c for receiving the proximal extent of the lower half 26b. Upon fitting the upper and lower halves 26a and 26b together, a suitable adhesive can be used at the overlapping trim portion 26c. Preferably, the adhesive comprises the thermoplastic from which the cartridge case 26 is made, with the thermoplastic being diluted in a small amount of solvent.

Figure 2B:
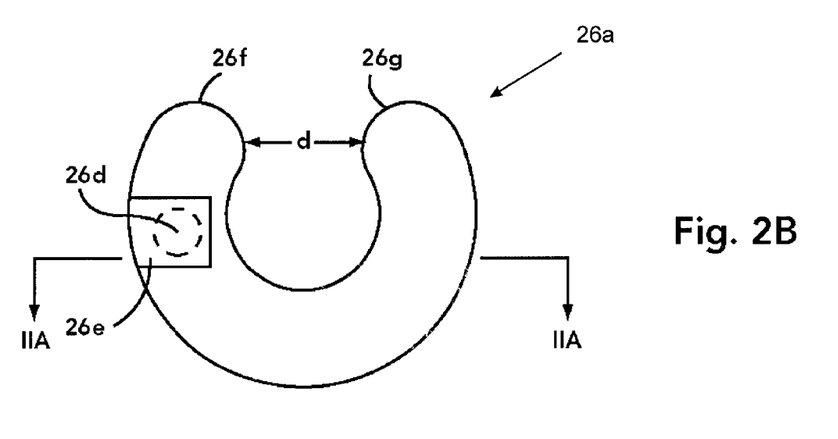

Turning to FIG. 2B, the upper half 26a also has a port 26d for permitting loading of a propulsive charge 28. Representative propellants include a nitrocellulose-base materials, especially particles, ball powder, or flakes. A small cover or seal 26e is placed over the port 26d. Each of the cartridge cases 26 has a substantial U-shape, with the ends 26f and 26g of the cartridge cases 26 being curved inwardly towards each other so that the distance d between ends 26f and 26g is less than the diameter of the cylindrical hollow shell of the ignition system 20. The cartridge case 26 of this invention is sufficiently pliable to permit the case 26 to be flexed so as to be fitted about the cylindrical hollow shell of the ignition system 20.

In operation, the mortar round 10 is actuated by igniting the ignition charge within the ignition system 18. The ignited charge escapes through the orifices of the cylindrical hollow shell to ignite the cartridge cases 22. When ignited, the cartridge cases 22 and propellant loaded therein produce sufficient gaseous products to propel the mortar round 10 out of the launch tube (not shown).

Figure 3:
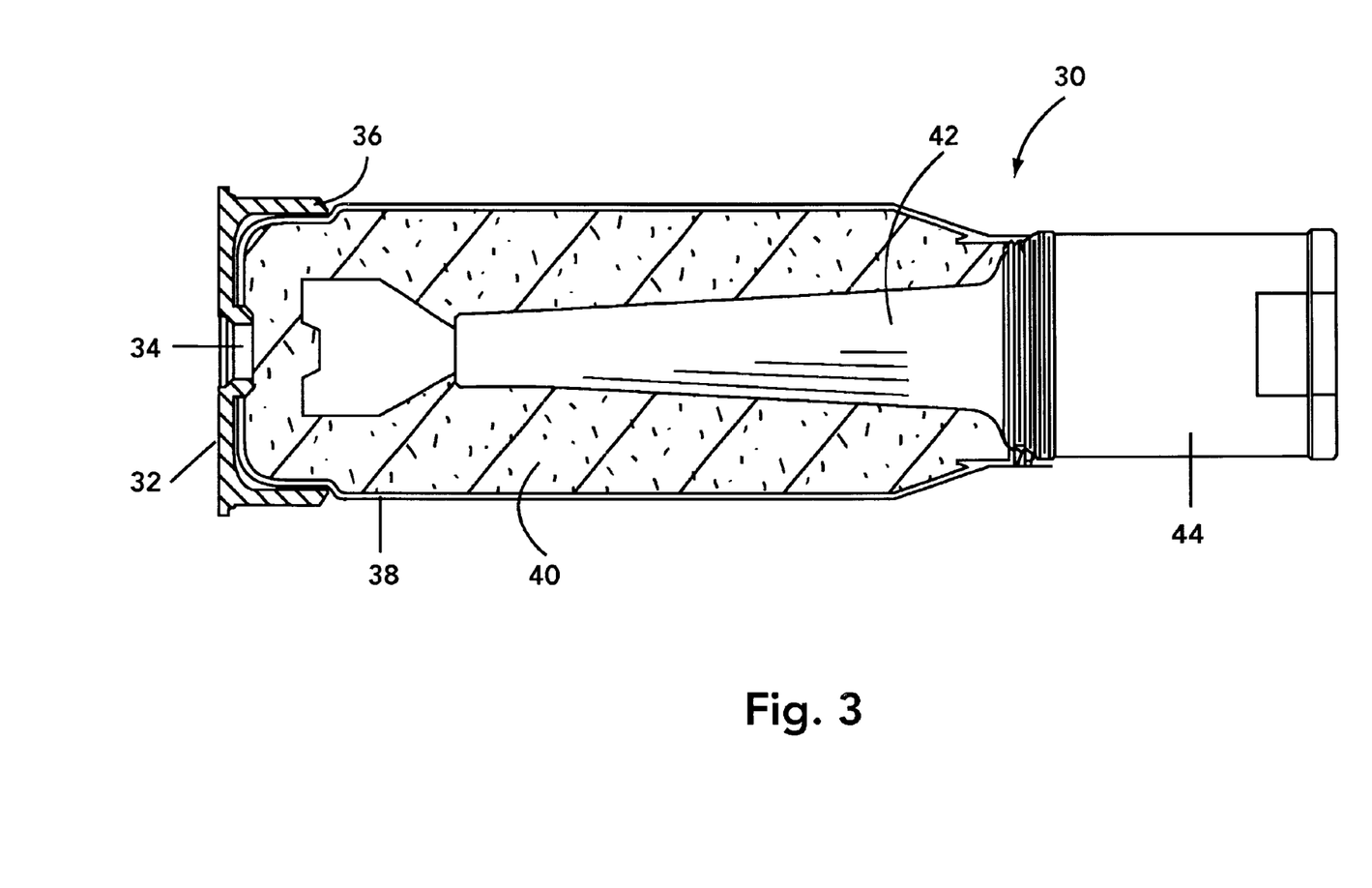
FIG. 3 is a side partial sectional view of a large-caliber tank ammunition round containing a combustible cartridge case in accordance with another embodiment of this invention.

FIG. 3 is a side sectional view of a large-caliber ammunition 30. The ammunition 30 includes a metal base 32 having a central orifice 34 at which an igniter (not shown) is placed. Extending forwardly from the metal base 32 and seated against the peripheral portion 36 of the metal base 32 is a combustible case 38. Loaded within the combustible case 38 is a propellant charge 40 and a projectile 42 embedded within the propellant charge 40. In the illustrated embodiment, the forward end of the projectile 42 is in the shape of a cylinder 44, which may be loaded with an energetic charge. Although not shown, modifications can be made to the projectile 42, including substituting the cylinder 44 with a warhead or a long-rod penetrator for arm-piercing and the like.

Figure 4:
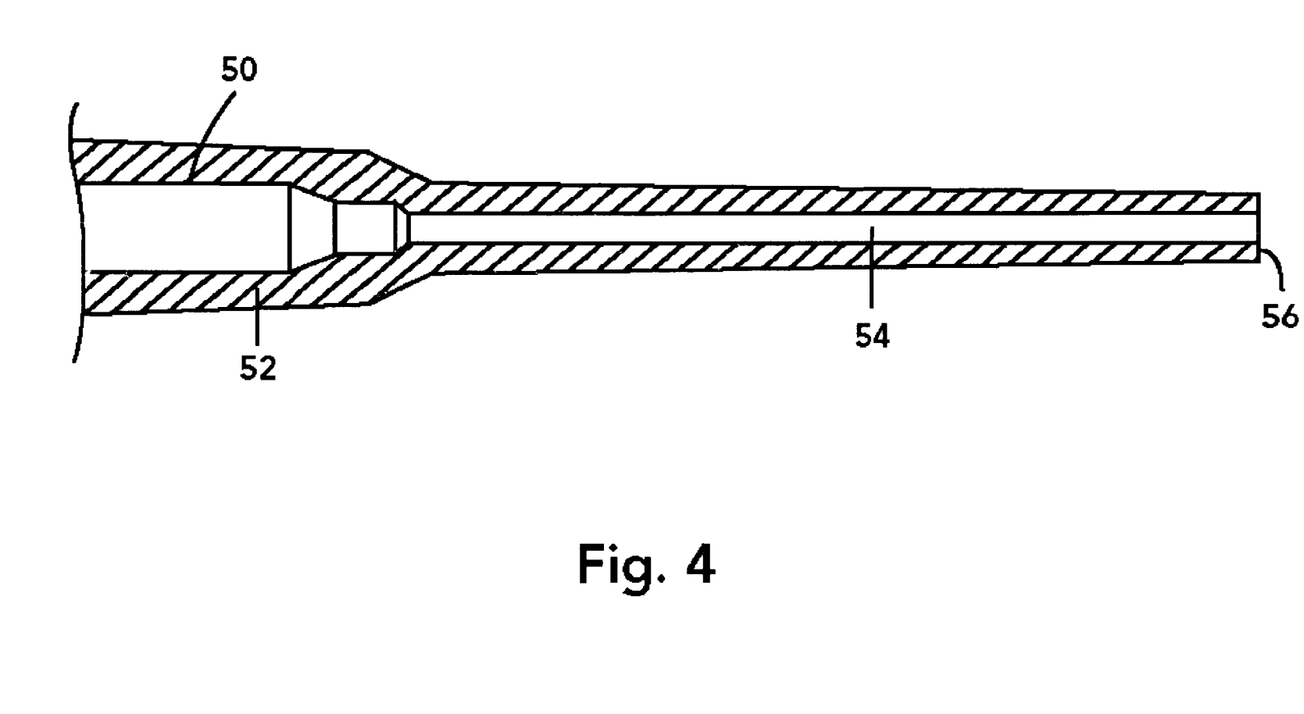
FIG. 4 is a side sectional view of a gun launcher tube for firing large-caliber ammunition.

In operation, the ammunition 30 is loaded into the chamber 50 of a gun tube 52, such as shown in FIG. 4. Actuation of the trigger causes the igniter to ignite the propellant charge 40 and the combustible cartridge case 38, thereby producing sufficient gas build-up inside the gun tube chamber to overcome frictional resistance between the projectile 42 and the bore 54 of the gun tube 52, and gravitational forces, thus propelling the projectile 42 from the muzzle 56 of the gun tube 52. Although not shown, ammunition 30 can be furnished with a sabot to increase gas build up and guide movement of the projectile 42 through the gun tube housing.

The following example serves to explain embodiments of the present invention in more detail. The example is not to be construed as being exhaustive or exclusive as to the scope of this invention.

EXAMPLE

Example 1 (poly(3,3-bis(azidomethyl)oxetane))

A 5 liter jacketed flask equipped with a mechanical stirrer was charged with 600 grams of tribromoneopentylalcohol (AmeriBrom, Inc. of New York), 1200 ml of toluene, and 6 grams of tetrabutylammonium bromide. The mixture was cooled to 12° C. and 193 grams of sodium hydroxide was added dropwise as a 40 wt % solution keeping the temperature at 12° C. After 36 hours the reaction mixture was washed with water until the pH was less than 9 to obtain the crude product which was distilled to obtain 3,3-bis (bromomethyl)oxetane in 65% yield.

A 5 liter jacketed flask equipped with a mechanical stirrer was charged with 1450 grams of the 3,3-bis(bromomethyl) oxetane and 1720 ml of toluene. The mixture was stirred and heated to 60° C. before 1600 ml of water, 14.7 grams of tetrabutylammonium bromide, and 862 grams of sodium azide were added. After 24 hours, the reaction mixture was cooled to room temperature and washed three times with 2000 ml of water. The toluene and water were removed from the organic layer by distillation to give pure 3,3-bis (azidomethyl)oxetane in 85% yield.

Under an argon atmosphere, 14.94 grams of butane diol was added to a flame dried 5 liter round-bottomed flask charged with 1340 ml of dry methylene chloride. To this mixture, 11.77 grams of borontrifluoride-etherate was added and the reaction was allowed to proceed for one hour at room temperature. The reactor was then cooled to −10° C. and 937.78 grams of the 3,3-bis(azidomethyl)oxetane was added. The solution was allowed to come to room temperature and left to react for three days. The reaction was then quenched by the addition of 50 ml of saturated brine solution. The organic phase was separated off and washed with 100 ml of 10 wt % sodium bicarbonate solution before the solvent was removed on a rotovapor. The resulting liquid was then poured into 5 liters of methanol to precipitate the polymer, which was filtered from the solution and dried under vacuum at 30° C.

Example 2 Chain Extended poly(3,3-bis (azidomethyl)oxetane)

In a 500 ml round bottom flask 50 g of poly(3,3-bis (azidomethyl)oxetane) with an OH equivalent weight of 3399 was dissolved in 250 ml of toluene. The toluene was then distilled from the polymer which was then re-dissolved in 70 ml of methylene chloride. To this solution, 2.56 g of toluene-2,4-diisocyanate was added together with 0.05 g of dibutyltindichloride. The solution was stirred at room temperature for 24 hours after which time 0.663 g of butane diol was added whereupon the solution gradually became more viscous. After a further 24 hours the solution was poured into 500 ml of methanol and the gummy precipitated polymer thoroughly mixed with the solvent. The solvent was decanted from the polymer which was washed three more times with methanol, and each time was mixed and kneaded with the solvent. At the end of this process the resulting polymer mass was not sticky and was cut into small pieces and dried under vacuum to give the final product.

Example 3

A sample of chain-extended polyBAMO weighing approximately 6 grams was melted and de-aerated under vacuum at 90° C. Then, the material was placed in a Teflon® block preheated to 90° C. The Teflon® block had a 7.62 cm (3 inch) long, 2.54 cm (1 inch) diameter semicircular cross-section groove. A matching block acting as a male mold was pressed down onto the sample, and the polyBAMO flowed into the groove and was left to solidify. After solidification, the mold was removed, leaving the solidified polyBAMO as a resilient half-cylinder.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A combustible ammunition cartridge case configured with a chamber for receiving a propellant and comprising at least one energetic thermoplastic binder, said energetic thermoplastic binder comprising at least one member selected from the group consisting of a chain-extended poly(bis-azidomethyloxetane) homopolymer and a chain-extended copolymer or terpolymer, wherein:
   (a) said chain-extended poly(bis-azidomethyloxetane) homopolymer comprises poly(bis-azidomethyloxetane) prepolymer blocks terminated with isocyanate-reactive groups and chain extended with at least one diisocyanate end-capping compound and at least one linking compound comprising two functional groups which are reactive with isocyanate moieties of said diisocyanate end-capping compound; and
   (b) said chain-extended copolymer or terpolymer comprises poly(bis-azidomethyloxetane) prepolymer blocks and one or more additional co-polymerizable prepolymer blocks, said poly(bis-azidomethyloxetane) prepolymer blocks and said additional co-polymerizable prepolymer blocks being terminated with isocyanate-reactive groups and chain extended with each other with at least one diisocyanate end-capping compound and at least one linking compound comprising two functional groups which are reactive with isocyanate moieties of said diisocyanate end-capping compound.

2. The combustible ammunition cartridge case of claim 1, wherein said energetic thermoplastic binder comprises said chain-extended poly(bis-azidomethyloxetane) homopolymer.

3. The combustible ammunition cartridge case of claim 1, wherein said energetic thermoplastic binder comprises said chain-extended copolymer or terpolymer, and further wherein said additional co-polymerizable prepolymer blocks are derived from at least one oxetane monomer.

4. The combustible ammunition cartridge case of claim 1, wherein said additional co-polymerizable prepolymer blocks are derived from at least one oxetane monomer selected from the group consisting of 3-azidomethyl-3-methyloxetane (AMMO) and 3-nitratomethyl-3-methyloxetane (NMMO).

5. The combustible ammunition cartridge case of claim 1, wherein said energetic thermoplastic binder comprises said chain-extended copolymer or terpolymer, and further wherein said additional co-polymerizable prepolymer blocks comprise at least one oxirane prepolymer.

6. The combustible ammunition cartridge case of claim 5, wherein said oxirane prepolymer comprises at least one member selected from the group consisting of difunctional glycidyl azide polymers and poly(glycidyl nitrate).

7. The combustible ammunition cartridge case of claim 1, further comprising polyethylene.

8. The combustible ammunition cartridge case of claim 1, further comprising at least one energetic filler selected from the group consisting of cyclotetramethylene tetranitramine (HMX), cyclotrimethylene trinitramine (RDX), 2,4,6,8,10,12-hexanitro-2,4,6,8,10,12-hexaazatetracyclo[5.5.0.0$^{5,9}$.0$^{3,11}$]-dodecane (CL-20), 4,10-dinitro-2,6,8,12-tetraoxa-4,10-diazatetracyclo[5.5.0.0$^{5,9}$,0$^{3,11}$]dodecane (TEX), and nitroguanidine (NQ).

9. The combustible ammunition cartridge case of claim 1, further comprising at least one oxidizer selected from the group consisting of ammonium perchlorate (AP), ammonium nitrate (AN), hydroxylammonium nitrate (HAN), ammonium dinitramide (ADN), potassium nitrate (KN), potassium dinitramide (KDN), and potassium perchlorate (KP).

10. The combustible ammunition cartridge case of claim 1, wherein said binder constitutes from about 70% by weight to about 100% by weight of said combustible ammunition cartridge case.

11. The combustible ammunition cartridge case of claim 1, wherein said chain-extended poly(bis-azidomethyloxetane) homopolymer constitutes from about 50% by weight to about 100% by weight of said binder.

12. Ammunition comprising:
   a combustible ammunition cartridge case configured with a chamber and comprising an energetic composition;
   propellant received within said chamber of said combustible ammunition cartridge case; and
   a projectile in operative relation with the combustible ammunition cartridge case to receive a propulsive force upon ignition of said combustible ammunition cartridge case and said propellant,
   said energetic composition comprising at least one energetic thermoplastic binder, said energetic thermoplastic binder comprising at least one member selected from the group consisting of a chain-extended poly(bis-azidomethyloxetane) homopolymer and a chain-extended copolymer or terpolymer, wherein:
   (a) said chain-extended poly(bis-azidomethyloxetane) homopolymer is derived from poly(bis-azidomethyloxetane) prepolymer blocks terminated with isocyanate-reactive groups and chain extended with at least one diisocyanate end-capping compound and at least one linking compound comprising two functional groups which are reactive with isocyanate moieties of said diisocyanate end-capping compound; and
   (b) said chain-extended copolymer or terpolymer is derived from poly(bis-azidomethyloxetane) prepolymer blocks and one or more additional co-polymerizable prepolymer blocks, said poly(bis-azidomethyloxetane) prepolymer blocks and said additional co-polymerizable prepolymer blocks being terminated with isocyanate-reactive groups and chain extended with each other with at least one diisocyanate end-capping compound and at least one linking compound comprising two functional groups which are reactive with isocyanate moieties of said diisocyanate end-capping compound.

13. The ammunition of claim 12, wherein said ammunition is a mortar round.

14. The ammunition of claim 12, wherein said ammunition comprises direct-fire or indirect-fire ammunition.

15. The ammunition of claim 12, wherein said energetic thermoplastic binder comprises said chain-extended poly(bis-azidomethyloxetane) homopolymer.

16. The ammunition of claim 12, wherein said energetic thermoplastic binder comprises said chain-extended copolymer or terpolymer, and further wherein said additional co-polymerizable prepolymer blocks comprise at least one oxetane prepolymer.

17. The ammunition of claim 16, wherein said additional co-polymerizable prepolymer blocks are derived from at least one oxetane monomer selected from the group consisting of 3-azidomethyl-3-methyloxetane (AMMO) and 3-nitratomethyl-3-methyloxetane (NMMO).

18. The ammunition of claim 12, wherein said energetic thermoplastic binder comprises said chain-extended copolymer or terpolymer, and further wherein said additional co-polymerizable prepolymer blocks comprise at least one oxirane prepolymer.

19. The ammunition of claim 18, wherein said oxirane prepolymer comprises at least one member selected from the group consisting of difunctional glycidyl azide polymers and poly(glycidyl nitrate).

20. The ammunition of claim 12, further comprising polyethylene.

21. The ammunition of claim 12, further comprising at least one energetic filler selected from the group consisting of cyclotetramethylene tetranitramine (HMX), cyclotrimethylene trinitramine (RDX), 2,4,6,8,10,12 hexanitro 2,4,6,8,10,12-hexaazatetracyclo[5.5.0.0$^{5,9}$.0$^{3,11}$]-dodecane (CL-20), 4,10-dinitro-2,6,8,12-tetraoxa-4,10-diazatetracyclo [5.5.0.0$^{5,9}$,0$^{3,11}$]dodecane (TEX), and nitroguanidine (NQ).

22. The ammunition of claim 12, further comprising at least one oxidizer selected from the group consisting of ammonium perchlorate (AP), ammonium nitrate (AN), hydroxylammonium nitrate (HAN), ammonium dinitramide (ADN), potassium nitrate (KN), potassium dinitramide (KDN), and potassium perchlorate (KP).

23. The ammunition of claim 12, wherein said binder constitutes from about 70% by weight to about 100% by weight of said combustible ammunition cartridge case.

24. The ammunition of claim 12, wherein said chain-extended poly(bis-azidomethyloxetane) homopolymer constitutes from about 50% by weight to about 100% by weight of said binder.

25. A method for making a combustible ammunition cartridge case configured with a chamber for receiving a propellant and comprising at least one energetic thermoplastic binder, said method comprising preparing the combustible ammunition cartridge case by performing at least one step selected from the group consisting of:

(a) providing poly(bis-azidomethyloxetane) prepolymer blocks terminated with isocyanate-reactive groups, end-capping the prepolymer blocks with at least one diisocyanate end-capping compound, and chain extending the end-capped prepolymer blocks with at least one linking compound comprising two functional groups which are reactive with isocyanate moieties of said diisocyanate end-capping compound to form a chain-extended poly(bis-azidomethyloxetane) homopolymer, and (b) providing poly(bis-azidomethyloxetane) prepolymer blocks and one or more additional co-polymerizable prepolymer blocks each terminated with isocyanate-reactive groups, end-capping the prepolymer blocks and the co-polymerizable prepolymer blocks with at least one diisocyanate end-capping compound, and chain extending the end-capped prepolymer blocks and the end-capped co-polymerizable prepolymer blocks with at least one linking compound comprising two functional groups which are reactive with isocyanate moieties of said diisocyanate end-capping compound to form a chain-extended copolymer or terpolymer.

26. The method of claim 25, wherein said method comprises step (a).

27. The method of claim 25, wherein said method comprises step (b).

28. A method for making ammunition comprising a combustible ammunition cartridge case configured with a chamber and comprising an energetic composition; propellant received within said chamber of the combustible ammunition cartridge case; and a projectile in operative relation with the combustible ammunition cartridge case to receive a propulsive force upon ignition of the combustible ammunition cartridge case and the propellant, the energetic composition comprising at least one energetic thermoplastic binder, said method comprising preparing the combustible ammunition cartridge case of the ammunition by performing at least one step selected from the group consisting of:

(a) providing poly(bis-azidomethyloxetane) prepolymer blocks terminated with isocyanate-reactive groups, end-capping the prepolymer blocks with at least one diisocyanate end-capping compound, and chain extending the end-capped prepolymer blocks with at least one linking compound comprising two functional groups which are reactive with isocyanate moieties of said diisocyanate end-capping compound to form a chain-extended poly(bis-azidomethyloxetane) homopolymer, and (b) providing poly(bis-azidomethyloxetane) prepolymer blocks and one or more additional co-polymerizable prepolymer blocks each terminated with isocyanate-reactive groups, end-capping the prepolymer blocks and the co-polymerizable prepolymer blocks with at least one diisocyanate end-capping compound, and chain extending the end-capped prepolymer blocks and the end-capped co-polymerizable prepolymer blocks with at least one linking compound comprising two functional groups which are reactive with isocyanate moieties of said diisocyanate end-capping compound to form a chain-extended copolymer or terpolymer.

29. The method of claim 28, wherein said method comprises step (a).

30. The method of claim 28, wherein said method comprises step (b).

* * * * *